US010826585B2

(12) United States Patent
Bolotin et al.

(10) Patent No.: US 10,826,585 B2
(45) Date of Patent: Nov. 3, 2020

(54) APPARATUS, SYSTEM AND METHOD OF ASYMMETRIC BEAMFORMING TRAINING

(71) Applicant: INTEL CORPORATION, Santa Clara, CA (US)

(72) Inventors: Ilya Bolotin, Nizhny Novgorod (RU); Alexander Maltsev, Nizhny Novgorod (RU); Cheng Chen, Portland, OR (US); Carlos Cordeiro, Portland, OR (US); Artyom Lomayev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 43 days.

(21) Appl. No.: 16/123,271

(22) Filed: Sep. 6, 2018

(65) Prior Publication Data
US 2019/0044596 A1    Feb. 7, 2019

Related U.S. Application Data

(60) Provisional application No. 62/555,208, filed on Sep. 7, 2017.

(51) Int. Cl.
H04B 7/06       (2006.01)
H04L 5/00       (2006.01)
(Continued)

(52) U.S. Cl.
CPC ......... *H04B 7/0617* (2013.01); *H04B 7/0413* (2013.01); *H04B 7/0695* (2013.01);
(Continued)

(58) Field of Classification Search
CPC .... H04B 7/0617; H04B 7/088; H04B 7/0695; H04B 7/0413; H04L 5/0064; H04L 1/06;
(Continued)

(56) References Cited

U.S. PATENT DOCUMENTS 8,743,838 B2      6/2014  Gong et al.
2011/0080898 A1   4/2011  Cordeiro et al.
(Continued)

FOREIGN PATENT DOCUMENTS

KR   20150079803   7/2015
WO   2018084901    5/2018
WO   2018190916    10/2018

OTHER PUBLICATIONS

International Search Report and the Written Opinion for International Application No. PCT/US2017/040100, dated Oct. 17, 2017, 7 pages.

(Continued)

Primary Examiner — Pao Sinkantarakorn
Assistant Examiner — Kabir U Jahangir
(74) Attorney, Agent, or Firm — Shichrur & Co.

(57) ABSTRACT

For example, an EDMG initiator STA of an asymmetric beamforming training may be configured to, during a Beacon Transmission Interval (BTI) in a Beacon Interval (BI), transmit a beacon via a sector of the EDMG initiator STA, the beacon including allocation information to allocate a beamforming training allocation for asymmetric beamforming training of the sector during a Data Transfer Interval (DTI) in the BI after the BTI, the beacon including one or more Receive Training (TRN-R) subfields for the asymmetric beamforming training of the sector; during the beamforming training allocation, to listen on the sector for one or more Sector Sweep (SSW) frames from one or more EDMG responder STAs; and, during the beamforming training allocation, to transmit via the sector a sector acknowledgement (ACK) frame including information based on the one or more SSW frames.

22 Claims, 7 Drawing Sheets

(51) Int. Cl.
| | |
|---|---|
| *H04W 72/04* | (2009.01) |
| *H04B 7/0413* | (2017.01) |
| *H04W 16/28* | (2009.01) |
| *H04B 7/08* | (2006.01) |
| *H04L 1/00* | (2006.01) |
| *H04W 88/12* | (2009.01) |
| *H04W 84/12* | (2009.01) |
| *H04W 88/06* | (2009.01) |

(52) U.S. Cl.
CPC ............... *H04B 7/088* (2013.01); *H04L 1/00* (2013.01); *H04L 5/0055* (2013.01); *H04W 16/28* (2013.01); *H04W 72/0446* (2013.01); *H04L 5/0023* (2013.01); *H04L 5/0048* (2013.01); *H04L 5/0064* (2013.01); *H04L 5/0082* (2013.01); *H04W 84/12* (2013.01); *H04W 88/06* (2013.01); *H04W 88/12* (2013.01)

(58) Field of Classification Search
CPC . H04L 1/1607; H04L 1/16; H04L 1/00; H04L 5/0055; H04L 5/0048; H04L 5/0023; H04L 5/0082; H04W 88/12; H04W 72/0446; H04W 16/28; H04W 84/12; H04W 88/06
See application file for complete search history.

(56) References Cited

U.S. PATENT DOCUMENTS

| | | |
|---|---|---|
| 2015/0103756 A1 | 4/2015 | Sinha |
| 2016/0087695 A1 | 3/2016 | Wang |
| 2016/0142965 A1 | 5/2016 | Sinha |
| 2016/0329938 A1 | 11/2016 | Jo et al. |
| 2017/0079031 A1 | 3/2017 | Maltsev, Jr. et al. |
| 2019/0052327 A1* | 2/2019 | Motozuka ............. H04L 1/0041 |
| 2019/0280749 A1* | 9/2019 | Wee ...................... H04B 7/0695 |
| 2019/0349782 A1* | 11/2019 | Kim ...................... H04W 16/28 |

OTHER PUBLICATIONS

International Search Report and the Written Opinion for International Application No. PCT/US2017/068321, dated Apr. 18, 2018, 7 pages.

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

\* cited by examiner

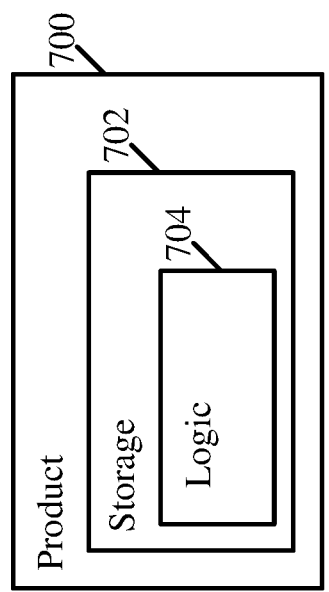

APPARATUS, SYSTEM AND METHOD OF ASYMMETRIC BEAMFORMING TRAINING

CROSS REFERENCE

This application claims the benefit of and priority from U.S. Provisional Patent Application No. 62/555,208 entitled "APPARATUS, SYSTEM AND METHOD OF BEAMFORMING TRAINING", filed Sep. 7, 2017, the entire disclosure of which is incorporated herein by reference.

TECHNICAL FIELD

Embodiments described herein generally relate to asymmetric beamforming training.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic illustration of a product of manufacture, in accordance with some demonstrative embodiments.

DETAILED DESCRIPTION

Figure 1:
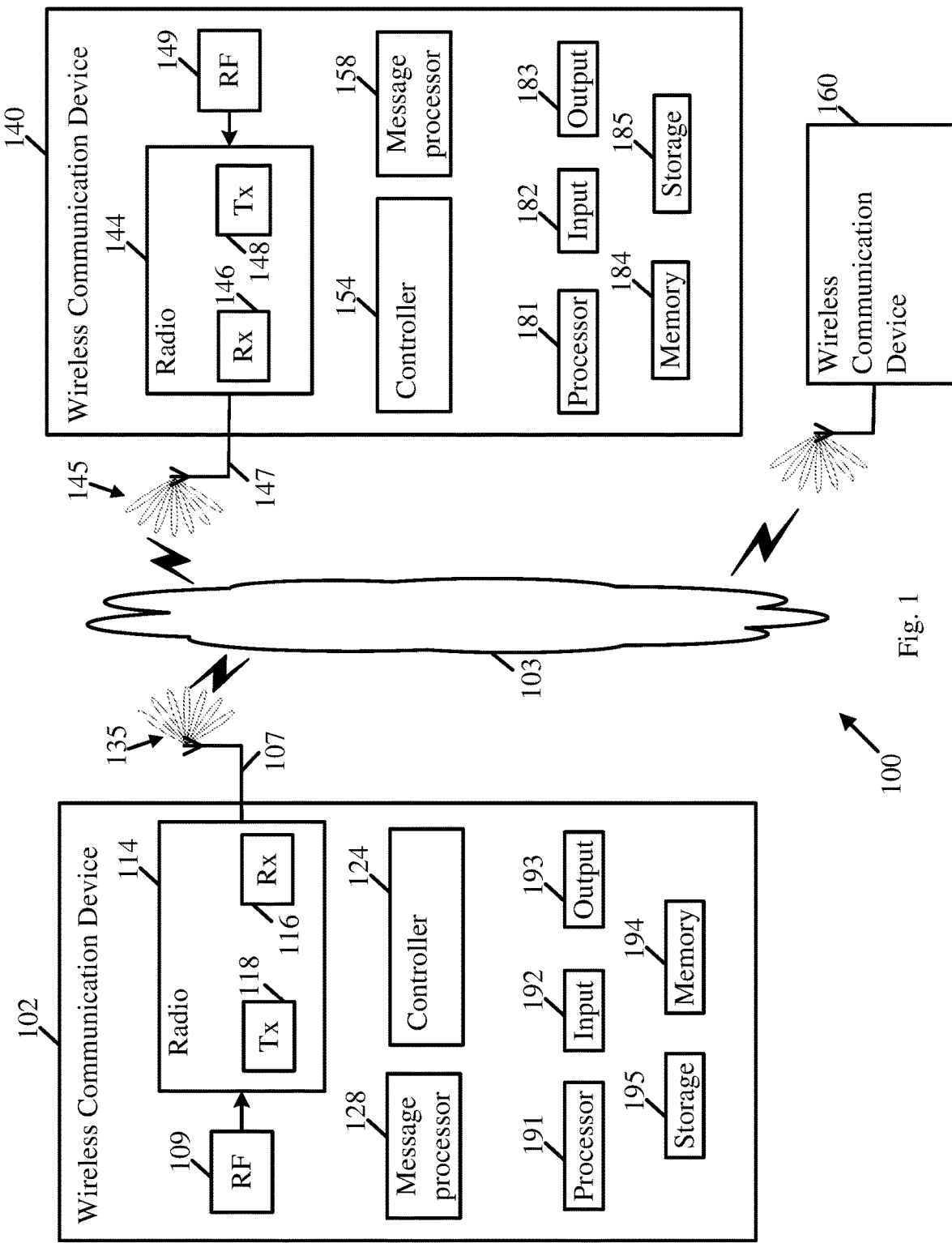
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016*); and/or IEEE 802.11ay (*P802.11ay/D1.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 7: Enhanced Throughput for Operation in License-Exempt Bands Above 45 GHz, November 2017*)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, a wireless communication device 160, and/or one more other devices.

In some demonstrative embodiments, devices 102, 140 and/or 160 may include a mobile device or a non-mobile, e.g., a static, device.

For example, devices 102, 140 and/or 160 may include, for example, a UE, an MD, a STA, an AP, a PC, a desktop computer, a mobile computer, a laptop computer, an Ultrabook™ computer, a notebook computer, a tablet computer, a server computer, a handheld computer, a Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or devices 140 and/or 160 may include, for example, one or more of a processor 181, an input unit 182, an output unit 183, a memory unit 184, and/or a storage unit 185. Devices 102, 140 and/or 160 may optionally include other suitable hardware components and/or software components. In some demonstrative embodiments, some or all of the components of one or more of devices 102, 140 and/or 160 may be enclosed in a common housing or packaging, and may be interconnected or operably associated using one or more wired or wireless links. In other embodiments, components of one or more of devices 102, 140 and/or 160 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140 and/or 160 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102, device 140 and/or device 160 may include one or more radios including circuitry and/or logic to perform wireless communication between devices 102, 140, 160 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102, device 140 and/or device 160 may include, operate as, perform the role of, and/or perform one or more functionalities of, one or more STAs. For example, device 102 may include at least one STA, and/or device 140 may include at least one STA.

In some demonstrative embodiments, device 102, device 140 and/or device 160 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102, 140 and/or 160 may include, operate as, perform the role of, and/or perform one or more functionalities of, any other wireless device and/or station, e.g., a WLAN STA, a WiFi STA, and the like.

In some demonstrative embodiments, device 102, device 140 and/or device 160 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102, device 140 and/or device 160 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102, device 140 and/or device 160 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, device 102 may be configured to operate as, perform the role of, and/or perform one or more functionalities of, an AP/PCP STA, e.g., an EDMG AP/PCP STA; and/or devices 140 and/or 160 may be configured operate as, perform the role of, and/or perform one or more functionalities of, a non-AP/PCP STA, e.g., an EDMG non-AP/PCP STA.

In other embodiments, device 102, device 140 and/or device 160 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102, 140 and/or 160 may be configured to communicate over a Next Generation 60 GHz (NG60) network, an Enhanced DMG (EDMG) network, and/or any other network. For example, devices 102, 140 and/or 160 may perform Multiple-Input-Multiple-Output (MIMO) communication, for example, for communicating over the NG60 and/or EDMG networks, e.g., over an NG60 or an EDMG frequency band.

In some demonstrative embodiments, devices 102, 140 and/or 160 may be configured to operate in accordance with one or more Specifications, for example, including one or more *IEEE* 802.11 *Specifications*, e.g., an *IEEE* 802.11-2016 *Specification*, an *IEEE* 802.11*ay Specification*, and/or any other specification and/or protocol.

Some demonstrative embodiments may be implemented, for example, as part of a new standard in an mmWave band, e.g., a 60 GHz frequency band and/or any other directional band, for example, as an evolution of an *IEEE* 802.11-2016 *Specification and/or an IEEE* 802.11*ad Specification*.

In some demonstrative embodiments, devices 102, 140 and/or 160 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase the data transmission rates defined in the *IEEE* 802.11*ad Specification*, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102, 140 and/or 160 may be configured to communicate MIMO communications over the mmWave wireless communication band.

In some demonstrative embodiments, device 102, device 140 and/or device 160 may be configured to support one or more mechanisms and/or features, for example, channel bonding, Single User (SU) MIMO, and/or Multi-User (MU) MIMO, for example, in accordance with an *IEEE* 802.11*ay Standard* and/or any other standard and/or protocol.

In some demonstrative embodiments, device 102, device 140 and/or device 160 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102, 140 and/or 160 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU-MIMO techniques.

In some demonstrative embodiments, devices 102, 140 and/or 160 may be configured to implement one or more mechanisms, which may be configured to enable SU and/or MU communication of Downlink (DL) and/or Uplink frames (UL) using a MIMO scheme.

In some demonstrative embodiments, device 102, device 140 and/or device 160 may be configured to implement one or more MU communication mechanisms. For example, devices 102, 140 and/or 160 may be configured to implement one or more MU mechanisms, which may be configured to enable MU communication of DL frames using a MIMO scheme, for example, between a device, e.g., device 102, and a plurality of devices, e.g., including device 140, device 160, and/or one or more other devices.

In some demonstrative embodiments, devices 102, 140 and/or 160 may be configured to communicate over an NG60 network, an EDMG network, and/or any other network and/or any other frequency band. For example, devices 102, 140 and/or 160 may be configured to communicate DL MIMO transmissions and/or UL MIMO transmissions, for example, for communicating over the NG60 and/or EDMG networks.

Some wireless communication Specifications, for example, the *IEEE* 802.11*ad*-2012 *Specification*, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102, 140 and/or 160 may be configured to communicate over a channel bandwidth, e.g., of at least 2.16 GHz, in a frequency band above 45 GHz.

In some demonstrative embodiments, devices 102, 140 and/or 160 may be configured to implement one or more mechanisms, which may, for example, enable to extend a single-channel BW scheme, e.g., a scheme in accordance with the *IEEE* 802.11*ad Specification* or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102, 140 and/or 160 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102, device 140 and/or device 160 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102, device 140 and/or device 160 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102, device 140 and/or device 160 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102, 140 and/or 160 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an *IEEE* 802.11-2016 *Standard*, and the like. For example, a non-EDMG station may include a DMG station, which is not an EDMG station.

Figure 2:
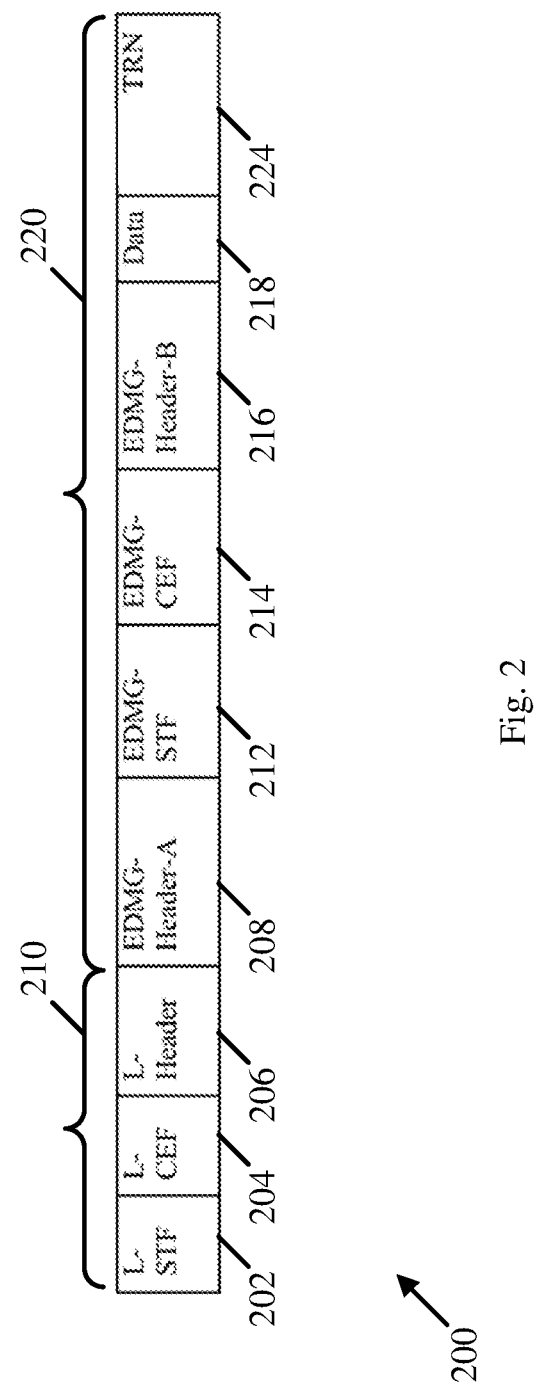
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments.

In one example, device 102 (FIG. 1), device 140 (FIG. 1), and/or device 160 (FIG. 1) may be configured to generate, transmit, receive and/or process one or more EDMG PPDUs having the structure and/or format of EDMG PPDU 200.

In one example, device 102 (FIG. 1), device 140 (FIG. 1), and/or device 160 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2, and/or one or more other additional or alternative fields.

In some demonstrative embodiments, EDMG-Header-B field 216 may be included, for example, in EDMG MU PPDUs, for example, on a per STA basis.

In some demonstrative embodiments, EDMG-Header-B field 216 corresponding to a STA addressed by the EDMG MU PPDU may include, for example, information relating to a transmission of a data unit, for example, a PHY Service Data Unit (PSDU) to the STA.

In some demonstrative embodiments, EDMG Header B field 216 may include for example, 64 bits. In other embodiments, the EDMG Header B field 216 may include any other number of bits.

In one example, EDMG Header B field 216 corresponding to the STA may include, for example, at least a scrambler seed field, a PSDU length field, e.g., to indicate a length of the PSDU to the STA, and/or one or more Modulation and Coding Scheme (MCS) fields to indicate one or more MCSs. For example, the Header B field may include first and second MCS fields to indicate MCSs for first and second respective spatial streams.

In other embodiments, EDMG Header B field 216 may include any other additional or alternative fields and/or information.

Referring back to FIG. 1, in some demonstrative embodiments, devices 102 and/or 140 may be configured to perform one or more operations of a beamforming training procedure or protocol, for example, between a PCP/AP STA and one or more, e.g., a plurality of, non-PCP/AP STAs. In one example, device 102 may operate as, perform the role of, and/or perform one or more functionalities of, a non-AP/PCP STA; and/or device 140 may operate as, perform the role of, and/or perform one or more functionalities of, an AP/PCP STA.

Some demonstrative embodiments are described herein with respect to beamforming training between an AP/PCP STA and one or more non-AP/PCP STAs. However, in other embodiments, the beamforming training may be performed between any other STAs.

In some demonstrative embodiments, devices 102, 140 and/or 160 may be configured to perform an asymmetric beamforming training procedure, e.g., as described below.

In some demonstrative embodiments, the asymmetric beamforming training procedure may be preformed between an EDMG initiator STA and one or more EDMG responder STAs, e.g., as described below.

In one example, device 102 may include, operate as, perform the role of, and/or perform one or more functionalities of, an EDMG initiator STA; and/or device 140 and/or device 160 may include, operate as, perform the role of, and/or perform one or more functionalities of an EDMG responder STA, e.g., as described below.

In some demonstrative embodiments, the asymmetric beamforming training procedure may be preformed, for example, to train an asymmetric communication link between the EDMG initiator STA and the one or more EDMG responder STAs, e.g., as described below.

In one example, an asymmetric link may be present when a first STA, e.g., the EDMG initiator STA, is able to receive frames from a second STA, e.g., an EDMG responder STA, while frame transmissions from the first STA may not be received by the second STA, for example, due to a difference in a link budget between an uplink and a downlink between the first and second STAs. For example, the difference in the link budget may result from a difference in a number of antenna elements between the first and second STAs, for example, if the first STA may use a quasi-omni antenna configuration to communicate with the second STA. To compensate for this difference, for example, a directional antenna configuration may be used on the AP for listening.

In some demonstrative embodiments, the asymmetric beamforming training procedure may enable an EDMG initiator STA and one or more EDMG responder STAs to perform beamforming training, for example, even in case of an asymmetric link when a quasi-omni antenna configuration is used by one of the STAs when attempting communication with a peer STA, e.g., as described below.

In some demonstrative embodiments, an asymmetric beamforming training procedure, e.g., in accordance with an *IEEE*802.11*ay Specification*, may be performed, for example, according to an allocation, e.g., a dedicated allocation, which may be scheduled, e.g., by an AP/PCP STA, for example, the EDMG initiator STA, e.g., as described below.

In some demonstrative embodiments, for example, in some use cases, implementations, scenarios, and/or deployments, it may not be advantageous to use a solution, which considers scheduling of a beamforming training allocation, which includes two consecutive steps, for example, a first step in which an AP/PCP STA performs sweeping through all sectors in the listening mode with the same duration of listening on each sector; and a second step in which the AP/PCP STA transmits acknowledgements for each sector.

In one example, this solution may a have a technical problem as it may consume a lot of time, for example, in case of a large number of sectors, e.g., as may be used in accordance with an IEEE 802.11ay implementation.

In another example, another technical problem may occur, for example, in scenarios where some or even most of the sectors are free of STAs, and, accordingly, listening to these free sectors for several space-time slots may be a waste of time and/or power.

In some demonstrative embodiments, for example, in some use cases, implementations, scenarios, and/or deployments, it may not be advantageous to use a solution, in which an AP/PCP STA schedules beamforming training allocation by a protocol in which, while transmitting scheduling through different sectors, the AP/PCP STA indicates different periods of this allocation. This period may be related to the period of listening in the respective sector during the first step of beamforming training allocation.

For example, this solution may a have a technical problem as it may require acknowledgement in an undefined period, which may require STAs to stay in a listening mode quite a long time. This requirement may lead to unnecessary power consumption.

In some demonstrative embodiments, devices 102, 140 and/or 160 may be configured to perform one or more operations and/or communications according to a beamforming procedure, mechanism, and/or protocol, which may be configured, for example, to support asymmetric beamforming training, e.g., as described below.

In other embodiments, one or more operations and/or communications of the beamforming procedure may be implemented with respect to any other additional or alternative type of beamforming training.

In some demonstrative embodiments, the beamforming procedure may be performed between an EDMG initiator STA, for example, an AP/PCP STA, e.g., device 102, and one or more EDMG responder STAs, for example, non AP/PCP STAs, e.g., devices 140 and 160, e.g., as described below.

In some demonstrative embodiments, a beamforming training allocation, e.g., in a Data Transfer Interval (DTI) of a Beacon Interval (BI), may be scheduled per sector, e.g., as described below.

For example, an AP/PCP STA, for example, an EDMG initiator STA, e.g., device 102, may be configured to schedule the beamforming training allocation during the DTI, e.g., as described below.

In some demonstrative embodiments, the beamforming training allocation may include one or more, e.g., several, slots, for example, space-time slots, during which the AP/PCP STA may be listening in one specific sector, e.g., as described below.

In some demonstrative embodiments, one or more EDMG responder STAs, for example, non AP/PCP STAs, e.g., devices 140 and/or 160, may be configured to transmit one or more Sector Sweep (SSW) frames to the AP/PCP STA, for example, during the one or more slots of the DTI, e.g., as described below.

In some demonstrative embodiments, the AP/PCP STA may be configured to transmit a sector acknowledge (ACK) frame, for example, after the space-time slots, e.g., as described below.

In some demonstrative embodiments, the sector ACK frame may contain information about STAs, which were detected by the AP/PCP STA during the listening mode, e.g., as described below.

In some demonstrative embodiments, the beamforming training procedure described herein may provide one or more technical benefits and/or advantages and/or may solve one or more technical problems, e.g., as described below.

For example, the beamforming training procedure described herein may provide more flexibility to the AP/PCP STA, for example, by allowing the AP/PCP STA to allocate a different number of space-time slots for different sectors, or even to skip any one or more sectors at all. Accordingly, the beamforming training procedure described herein may support performing asymmetric beamforming training, for example, even only in some specific sector or a plurality of specific sectors. As a result, the beamforming training procedure described herein may provide technical benefits, for example, at least in terms of power consumption, medium usage and/or time duration.

In some demonstrative embodiments, a beamforming training procedure, for example, of asymmetric beamforming training and/or any other beamforming training, may include, for example, scheduling, e.g., during a Beacon Transmission Interval (BTI) of a BI, one or more beamforming training allocations to be allocated during a DTI of the BI, e.g., as described below.

In some demonstrative embodiments, a STA, for example, an AP/PCP STA, e.g., device 102, may be configured to schedule one or more beamforming training allocations, for example, during a DTI of a BI, for asymmetric beamforming training, e.g., as described below.

In some demonstrative embodiments, device 102 may include, operate as, perform the role of, and/or perform one or more functionalities of, an EDMG initiator STA, e.g., an AP/PCP STA; devices 140 and/or 160 may include, operate as, perform the role of, and/or perform one or more functionalities of, an EDMG responder STA, e.g., a non AP/PCP STA, e.g., as described below.

In some demonstrative embodiments, an EDMG initiator STA, e.g., device 102, may perform an asymmetric beamforming training with one or more EDMG responder STAs, e.g., devices 140 and 160, e.g., as described below.

In some demonstrative embodiments, the EDMG initiator STA e.g., device 102, may be configured to transmit a beacon, for example, during a BTI of a BI, e.g., as described below.

In some demonstrative embodiments, the EDMG initiator STA e.g., device 102, may be configured to transmit the beacon including one or more Training (TRN) subfields, for example, Receive Training (TRN-R) subfields, e.g., as described below.

In some demonstrative embodiments, the EDMG initiator STA e.g., device 102, may be configured to transmit the beacon through an antenna sector for which beamforming training, e.g., asymmetric beamforming training, is to be performed, e.g., as described below.

In some demonstrative embodiments, the EDMG initiator STA e.g., device 102, may be configured to determine a schedule in a DTI of the BI, e.g., after the BTI, for an allocation of beamforming training for the sector, e.g., as described below.

In some demonstrative embodiments, controller 124 may be configured to control, cause and/or trigger an EDMG initiator STA implemented by device 102 to, during a BTI in a BI, transmit a beacon via a sector of device 102, e.g., as described below.

In some demonstrative embodiments, controller 124 may be configured to control, cause and/or trigger an EDMG initiator STA implemented by device 102 to generate the beacon to include allocation information to allocate a beamforming training allocation for asymmetric beamforming training of the sector during a DTI in the BI after the BTI, e.g., as described below.

In some demonstrative embodiments, controller 124 may be configured to control, cause and/or trigger an EDMG initiator STA implemented by device 102 to generate the beacon to include one or more Receive Training (TRN-R) subfields for the asymmetric beamforming training of the sector, e.g., as described below.

In some demonstrative embodiments, controller 124 may be configured to control, cause and/or trigger the EDMG initiator STA implemented by device 102 to transmit the allocation information in an EDMG extended schedule element, as described below.

In some demonstrative embodiments, the EDMG initiator STA e.g., device 102, may be configured to include the allocation information of the beamforming training allocation, for example, as part of the EDMG extended schedule element and/or any other element, e.g., as described below.

In some demonstrative embodiments, the EDMG initiator STA e.g., device 102, may be configured to transmit the allocation information, e.g., in the EDMG extended schedule element, via the sector for which the beamforming training is to be performed, e.g., as described below.

In some demonstrative embodiments, the one or more TRN-R subfields may be used for the asymmetric beamforming training of the sector, e.g., as described below.

In some demonstrative embodiments, the allocation may include one or more slots, for example, space-time slots, e.g., as described below. In other embodiments, any other configuration and/or types of one or more slots may be implemented.

In some demonstrative embodiments, the beamforming training allocation may include a plurality of slots, during which device 102 may be configured to listen on the sector for the one or more SSW frames, e.g., as described below.

In some demonstrative embodiments, the plurality of slots may include a plurality of space-time slots, e.g., as described below.

In some demonstrative embodiments, a duration of a slot of the plurality of slots may be based on, for example, a sum of an air propagation time (aAirPropagationTime), a transmission time of an SSW frame (TXTIME(SSW)) and a short Interframe Space (aSIFSTime), e.g., as described below.

In one example, a space-time slot may have a duration of aAirPropagationTime+TXTIME(SSW)+aSIFSTime, e.g., as described below.

In other embodiments, any other duration for the space-time slot may be used.

In some demonstrative embodiments, a STA, e.g., an EDMG responder STA, for example, a non-PCP/AP STA, e.g., device 140, may be configured to receive the beacon and to use the TRN-R fields to perform receive antenna training, e.g., as described below.

In some demonstrative embodiments, controller 154 may be configured to control, cause and/or trigger an EDMG responder STA implemented by device 140 to, during the BTI in the BI, receive from an EDMG initiator STA, e.g., device 102, the beacon including the allocation information to allocate the beamforming training allocation and the one or more TRN-R subfields for the asymmetric beamforming training with the sector of device 102, e.g., as described below.

In some demonstrative embodiments, the beamforming training allocation may include the plurality of slots for the asymmetric beamforming training with the sector of device 102 during the DTI in the BI after the BTI, e.g., as described above.

In some demonstrative embodiments, controller 154 may be configured to control, cause and/or trigger the EDMG responder STA implemented by device 140 to process the EDMG extended schedule element including the allocation information, for example, in the beacon from device 102.

In some demonstrative embodiments, the EDMG responder STA, e.g., device 140, may be configured to transmit an SSW frame to the EDMG initiator STA e.g., device 102, for example, during the DTI, for example, based on the allocation information from the EDMG responder STA, e.g., as described below.

In some demonstrative embodiments, the EDMG responder STA, e.g., device 140, may be configured to select a slot to transmit the SSW frame, e.g., randomly.

In other embodiments, the slot may be selected according to any other criterion or scheme.

In some demonstrative embodiments, the EDMG responder STA e.g., device 140, may be configured to transmit the SSW frame in a directional mode, for example, using the same sector trained by the TRN-R, e.g., as described below.

In some demonstrative embodiments, controller 154 may be configured to control, cause and/or trigger the EDMG responder STA implemented by device 140 to select a selected slot from the plurality of slots, e.g., as described below.

In some demonstrative embodiments, controller 154 may be configured to control, cause and/or trigger the EDMG responder STA implemented by device 140 to randomly select the selected slot for transmission of the SSW frame from the plurality of slots, e.g., as described below.

In some demonstrative embodiments, controller 154 may be configured to control, cause and/or trigger the EDMG responder STA implemented by device 140 to transmit an SSW frame to device 102 during the slot, e.g., as described below.

In some demonstrative embodiments, controller 154 may be configured to control, cause and/or trigger the EDMG responder STA implemented by device 140 to transmit the SSW frame via a sector of device 140, which is trained by the TRN-R subfields of the beacon from device 102, e.g., as described below.

In some demonstrative embodiments, the EDMG initiator STA e.g., device 102, may be configured to listen over the sector from which the beacon is transmitted, during the beamforming training allocation in the DTI, e.g., as described below.

In some demonstrative embodiments, controller 124 may be configured to control, cause and/or trigger the EDMG initiator STA implemented by device 102 to, during the beamforming training allocation, listen on the sector for one or more SSW frames from one or more EDMG responder STAs, for example, including device 140, e.g., as described below.

In some demonstrative embodiments, device 102 may receive the SSW frame from device 140, e.g., via the sector of device 102.

In some demonstrative embodiments, the EDMG initiator STA e.g., device 102, may be configured to transmit a sector ACK frame, for example, following the allocation in the DTI, e.g., as described below.

In some demonstrative embodiments, controller 124 may be configured to control, cause and/or trigger the EDMG initiator STA implemented by device 102 to, during the beamforming training allocation, transmit via the sector a sector ACK frame including information based on the one or more SSW frames, e.g., including the SSW frame from device 140.

In some demonstrative embodiments, for example, the sector ACK frame may include information based on the SSW frame from device 140, e.g., as described below.

In some demonstrative embodiments, controller 124 may be configured to control, cause and/or trigger the EDMG initiator STA implemented by device 102 to transmit the sector ACK frame after the plurality of slots of the beamforming training allocation, e.g., as described below.

In some demonstrative embodiments, the sector ACK frame may be a Medium Beamforming Interframe Space (MB IFS) interval after the plurality of slots.

In some demonstrative embodiments, controller 124 may be configured to control, cause and/or trigger the EDMG initiator STA implemented by device 102 to transmit the sector ACK frame an MBIFS interval after the plurality of slots of the beamforming training allocation, e.g., as described below.

In some demonstrative embodiments, the EDMG initiator STA e.g., device 102, may be configured to transmit the sector ACK frame, for example, an n MBIFS after the slots in the beamforming training allocation, e.g., as described below. In other embodiments, the sector ACK frame may be transmitted at any other timing.

In some demonstrative embodiments, the EDMG initiator STA e.g., device 102, may be configured to transmit the sector ACK frame, for example, via the same sector used by the EDMG initiator STA for listening during the beamforming training allocation, e.g., as described below.

In some demonstrative embodiments, the EDMG initiator STA e.g., device 102, may be configured to include in the sector ACK frame feedback information corresponding to one or more STAs, e.g., including the EDMG responder STA of device 140, from which the EDMG initiator STA has received an SSW frame during the beamforming training allocation, e.g., as described below.

In some demonstrative embodiments, controller 154 may be configured to control, cause and/or trigger the EDMG responder STA implemented by device 140 to attempt to receive a sector ACK frame from device 102 during the beamforming training allocation, e.g., as described below.

In some demonstrative embodiments, controller 154 may be configured to control, cause and/or trigger the EDMG responder STA implemented by device 140 to attempt to receive the sector ACK frame from device 102 via the sector of device 140, which is trained by the TRN-R subfields of the beacon from device 102, e.g., as described below.

In one example, the EDMG responder STA, e.g., device 140, may be configured to switch to a directional receive mode in the sector of device 140, which is trained by the TRN-R, for example, after transmitting the SSW frame, for example, to allow the EDMG responder STA to receive the sector ACK frame, e.g., from the EDMG initiator STA.

In some demonstrative embodiments, devices 102 and/or 140 may communicate the beacon, the SSW frame, and the sector ACK frame over a frequency band above 45 GHz, e.g., as described below.

In some demonstrative embodiments, controller 124 may be configured to control, cause and/or trigger the EDMG initiator STA implemented by device 102 to communicate the beacon, the SSW frame, and the sector ACK frame over a frequency band above 45 GHz, e.g., as described below.

In some demonstrative embodiments, controller 154 may be configured to control, cause and/or trigger the EDMG responder STA implemented by device 140 to communicate the beacon, the SSW frame, and the sector ACK frame over a frequency band above 45 GHz, e.g., as described below.

In some demonstrative embodiments, devices 102 and/or 140 may communicate the beacon, the SSW frame, and the sector ACK frame over a channel bandwidth of 2.16 GHz, 4.32 GHz, 6.48 GHz, or 8.64 GHz.

In some demonstrative embodiments, controller 124 may be configured to control, cause and/or trigger the EDMG initiator STA implemented by device 102 to communicate the beacon, the SSW frame, and the sector ACK frame over a channel bandwidth of 2.16 GHz, 4.32 GHz, 6.48 GHz, or 8.64 GHz, e.g., as described below.

In some demonstrative embodiments, controller 154 may be configured to control, cause and/or trigger the EDMG responder STA implemented by device 140 to communicate the beacon, the SSW frame, and the sector ACK frame over a channel bandwidth of 2.16 GHz, 4.32 GHz, 6.48 GHz, or 8.64 GHz, e.g., as described below.

In some demonstrative embodiments, devices 102 and/or 140 may communicate the beacon, the SSW frame, and/or the sector ACK frame over any other channel bandwidth and/or frequency band.

Figure 3:
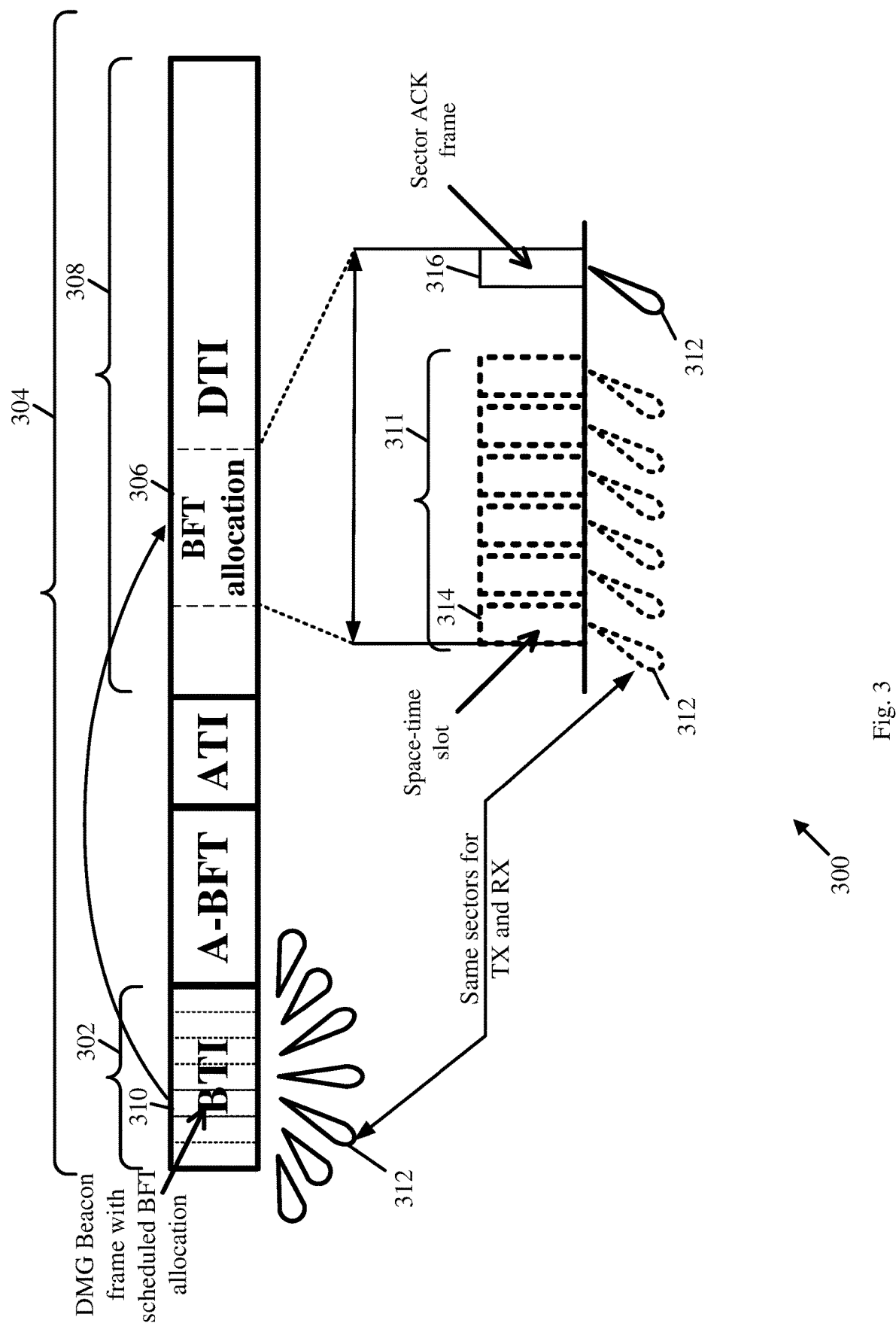
FIG. 3 is a schematic illustration of an asymmetric beamforming training, in accordance with some demonstrative embodiments.

Reference is made to FIG. 3, which schematically illustrates an asymmetric beamforming training 300, in accordance with some demonstrative embodiments.

In some demonstrative embodiments, the asymmetric beamforming training 300 may be preformed between an EDMG initiator STA and one or more EDMG responder STAs, e.g., as described below.

In one example, device 102 (FIG. 1) may include, operate as, perform the role of, and/or perform one or more functionalities of, the EDMG initiator STA; and/or device 140 (FIG. 1) may include, operate as, perform the role of, and/or perform one or more functionalities of an EDMG responder STA.

In some demonstrative embodiments, as shown in FIG. 3, during a BTI 302 in a BI 304, the EDMG initiator STA may transmit a beacon 310 via a sector 312 of the EDMG initiator STA, In some demonstrative embodiments, the beacon 310 may include allocation information to allocate a beamforming training allocation ("BFT allocation") 306 for asymmetric beamforming training of the sector 312 during a DTI 308 in the BI 304, e.g., after the BTI 302.

In some demonstrative embodiments, as shown in FIG. 3, the beamforming training allocation 306 may include a plurality of slots 311, during which the EDMG initiator STA is to listen on the sector 312 for one or more SSW frames, for example, from the one or more EDMG responder STAs.

In some demonstrative embodiments, an EDMG responder STA may select a selected slot 314 from the plurality of space-time slots 311, and may transmit an SSW frame to the EDMG initiator STA during the selected slot 314.

In some demonstrative embodiments, as shown in FIG. 3, the EDMG initiator STA may transmit a sector ACK frame 316, e.g., via the sector 312, including information based on the one or more SSW frames from the one or more EDMG responder STAs.

In some demonstrative embodiments, for example, as shown in FIG. 3, the EDMG initiator STA may be configured to use the same sector 312 for transmission, e.g., for transmitting the allocation information in the beacon and/or the TRN-R subfields, as well as for reception during one or more slots in the BFT allocation 306.

In some demonstrative embodiments, a procedure of asymmetric beamforming training, e.g., asymmetric beamforming training 300, between a PCP/AP STA, e.g., the EDMG initiator STA, and one or more non-PCP and non-AP STAs, e.g., one or more EDMG responder STAs, may include, for example, one or more operations, e.g., as described below.

In some demonstrative embodiments, the procedure of the asymmetric beamforming training may include, for example, one or more operations of scheduling during the BTI, for example, BTI 302, e.g., as described below.

In some demonstrative embodiments, the PCP/AP may append TRN-R subfields to a DMG Beacon frame, e.g., beacon 310, transmitted through the sector, e.g. sector 312, for which the asymmetric beamforming training is going to be performed.

In some demonstrative embodiments, the PCP/AP may schedule beamforming training allocation in a DTI, e.g., beamforming training allocation 306 in DTI 308, and may include information about the beamforming training allocation in the EDMG Extended Schedule element transmitted through the sector for which the asymmetric beamforming training is going to be performed, e.g., sector 312.

In some demonstrative embodiments, a non-PCP and non-AP STA that receives the DMG Beacon frame with the appended TRN-R fields, e.g., beacon 310, and that decides to perform asymmetric beamforming training shall use the TRN-R fields appended in the DMG Beacon frame to perform its receive antenna training.

In some demonstrative embodiments, the non-PCP or non-AP STA may use one or more of the beamforming training allocations announced in the EDMG Extended Schedule element to perform the asymmetric beamforming training with the PCP/AP.

In some demonstrative embodiments, the procedure of the asymmetric beamforming training may include, for example, one or more operations during the beamforming training allocation in the DTI, for example, beamforming training allocation 306 in DTI 308, e.g., as described below.

In some demonstrative embodiments, the PCP/AP shall listen in the same sector, which was used for transmission of the DMG Beacon frame containing the allocation during the last BTI, e.g., sector 312.

In some demonstrative embodiments, while listening the PCP/AP shall provide several space-time slots for a responder's transmission. A space-time slot may have a duration of aAirPropagationTime+TXTIME(SSW)+aSIFSTime, e.g., as described above.

In one example, a number, denoted $N_{STS}$, of the space-time slots may be explicitly defined by the PCP/AP, for example, in a description of the beamforming training allocation, e.g., in the EDMG Extended Schedule element; may be calculated by the non-PCP or non-AP STA, for example, based on a duration of the beamforming training allocation; and/or may be defined in any other manner.

In some demonstrative embodiments, the non-PCP or non-AP STA, e.g., the EDMG responder STA, may randomly choose a space-time slot for transmission of an SSW frame. The transmission of the SSW frame may be performed in a directional mode using a sector trained by TRN-R in the last BTI, e.g., BTI 302, for example, if DMG antenna reciprocity and antenna reciprocity is assumed.

In some demonstrative embodiments, after transmission of the SSW frame(s), the non-PCP or non-AP STA may switch to a directional receive mode, for example, in the sector trained by the TRN-R in the last BTI.

In some demonstrative embodiments, MBIFS after the PCP/AP completes listening for the $N_{STS}$ space-time slots, e.g., time slots 311, the PCP/AP may transmit a Sector ACK frame in the same sector which was used for listening, e.g., sector ACK frame 316 via sector 312.

In some demonstrative embodiments, the Sector ACK frame may include the information about the STAs that have been trained during the beamforming training allocation.

Referring back to FIG. 1, in some demonstrative embodiments an EDMG initiator STA, e.g., device 102, may perform an asymmetric beamforming training with a plurality of EDMG responder STAs, for example, including two or more EDMG responder STAs, e.g., devices 140 and 160, e.g., as described below.

In some demonstrative embodiments, during the BTI in the BI, device 102 may transmit a plurality of beacons via a respective plurality of sectors of device 102.

In some demonstrative embodiments, a beacon, e.g., each beacon, transmitted via a sector, may include allocation information to allocate a beamforming training allocation for asymmetric beamforming training of the sector during a DTI in the BI after the BTI, e.g., as described below.

In some demonstrative embodiments, controller 124 may be configured to control, cause and/or trigger the EDMG initiator STA implemented by device 102 to transmit during the BTI a first beacon via a first sector and a second beacon via a second sector, e.g., as described below.

In some demonstrative embodiments, the first beacon may include first allocation information to allocate a first beamforming training allocation for the first sector during the DTI, e.g., as described below.

In some demonstrative embodiments, the second beacon may include second allocation information to allocate a second beamforming training allocation for the second sector during the DTI, e.g., as described below.

In some demonstrative embodiments, the first beamforming training allocation may be different from the second beamforming training allocation, e.g., as described below.

In some demonstrative embodiments, controller 124 may be configured to control, cause and/or trigger the EDMG initiator STA implemented by device 102 to, during the first beamforming training allocation, listen on the first sector for one or more first SSW frames from one or more first EDMG responder STAs, for example, including device 140, e.g., as described below.

In some demonstrative embodiments, controller 124 may be configured to control, cause and/or trigger the EDMG initiator STA implemented by device 102 to, during the first beamforming training allocation, transmit via the first sector a first sector ACK frame including information based on the one or more first SSW frames, for example, including a first SSW frame from device 140, e.g., as described below.

In some demonstrative embodiments, controller 124 may be configured to control, cause and/or trigger the EDMG initiator STA implemented by device 102 to, during the second beamforming training allocation, listen on the second sector for one or more second SSW frames from one or more second EDMG responder STAs, for example, including device 160, e.g., as described below.

In some demonstrative embodiments, controller 124 may be configured to control, cause and/or trigger the EDMG initiator STA implemented by device 102 to, during the second beamforming training allocation, transmit via the second sector a second sector ACK frame including information based on the one or more second SSW frames, for example, including a second SSW frame from device 160, e.g., as described below.

Figure 4:
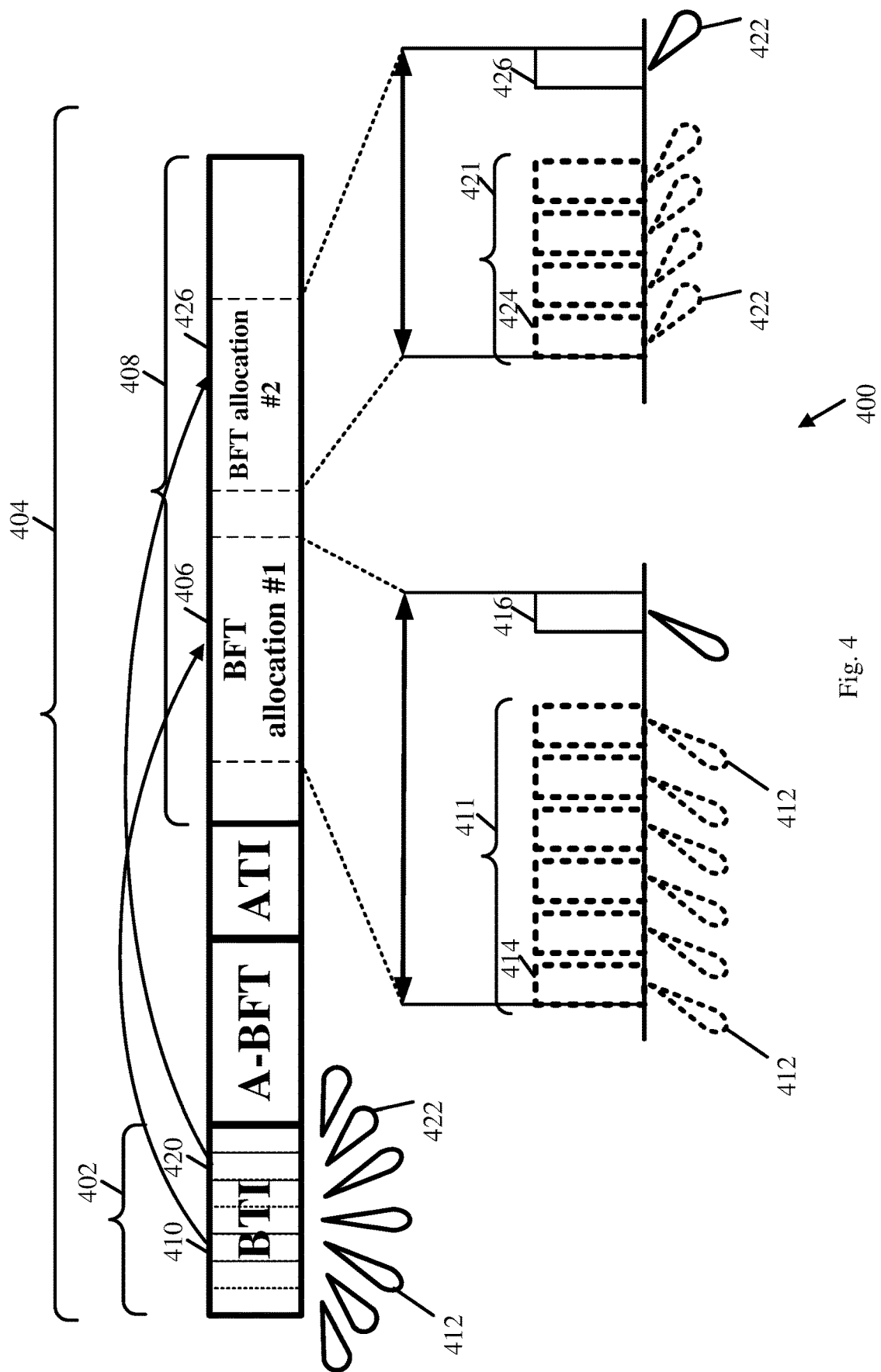
FIG. 4 is a schematic illustration of an asymmetric beamforming training, in accordance with some demonstrative embodiments.

Reference is made to FIG. 4, which schematically illustrates an asymmetric beamforming training 400, in accordance with some demonstrative embodiments.

In some demonstrative embodiments, the asymmetric beamforming training 400 may be preformed between an EDMG initiator STA and two or more EDMG responder STAs, e.g., including at least a first EDMG responder STA and a second EDMG responder STA, e.g., as described below.

In one example, device 102 (FIG. 1) may include, operate as, perform the role of, and/or perform one or more functionalities of, EDMG initiator STA 402; and/or device 140 (FIG. 1) and/or device 160 (FIG. 1) may include, operate as, perform the role of, and/or perform one or more functionalities of the first EDMG responder STA and/or the second EDMG responder STA, respectively.

In some demonstrative embodiments, as shown in FIG. 4, the EDMG initiator STA may transmit during a BTI 402 of a BI 404 a first beacon 410 via a first sector 412.

In some demonstrative embodiments, as shown in FIG. 4, the EDMG initiator STA may transmit, during BTI 402 of BI 404, a second beacon 420 via a second sector 422, e.g., as described below.

In some demonstrative embodiments, the first beacon 410 may include first allocation information to allocate a first beamforming training allocation 406 for the first sector 412 during a DTI 408 of BI 404, e.g., as described below.

In some demonstrative embodiments, the second beacon 420 may include second allocation information to allocate a second beamforming training allocation 426 for the second sector 422 during the DTI 408.

In some demonstrative embodiments, as shown in FIG. 4, the first beamforming training allocation 406 may include a plurality of space-time slots 411, during which the EDMG initiator STA is to listen on the sector 412 for one or more SSW frames from one or more first EDMG responder STAs.

In some demonstrative embodiments, as shown in FIG. 4, the second beamforming training allocation 426 may include a plurality of space-time slots 421, during which the EDMG initiator STA is to listen on the sector 422 for one or more SSW frames from one or more second EDMG responder STAs.

In some demonstrative embodiments, a first EDMG responder STA may select a selected slot 414 from the plurality of slots 411 and may transmit a first SSW frame during the selected slot 414 to the EDMG initiator STA.

In some demonstrative embodiments, a second EDMG responder STA may select a selected slot 424 from the plurality of slots 421 and may transmit a second SSW frame during the selected slot 424 to the EDMG initiator STA.

In some demonstrative embodiments, as shown in FIG. 4, the EDMG initiator STA may transmit via the first sector 412 a first sector ACK frame 416 including information based on the one or more first SSW frames from the one or more first EDMG responder STAs, e.g., including the first SSW frame from the first EDMG responder STA.

In some demonstrative embodiments, as shown in FIG. 4, the EDMG initiator STA may transmit via the second sector 422 a second sector ACK frame 426 including information based on the one or more second SSW frames from the one or more second EDMG responder STAs, e.g., including the second SSW frame from the second EDMG responder STA.

In some demonstrative embodiments, for example, as shown in FIG. 4, the EDMG initiator STA, may be configured to use BTI 402 to schedule two beamforming training allocations for two sectors, for example, even for two non-consecutive sectors, e.g., beamforming training allocations 406 and 426 for the two non-consecutive sectors 412 and 422, respectively.

Figure 5:
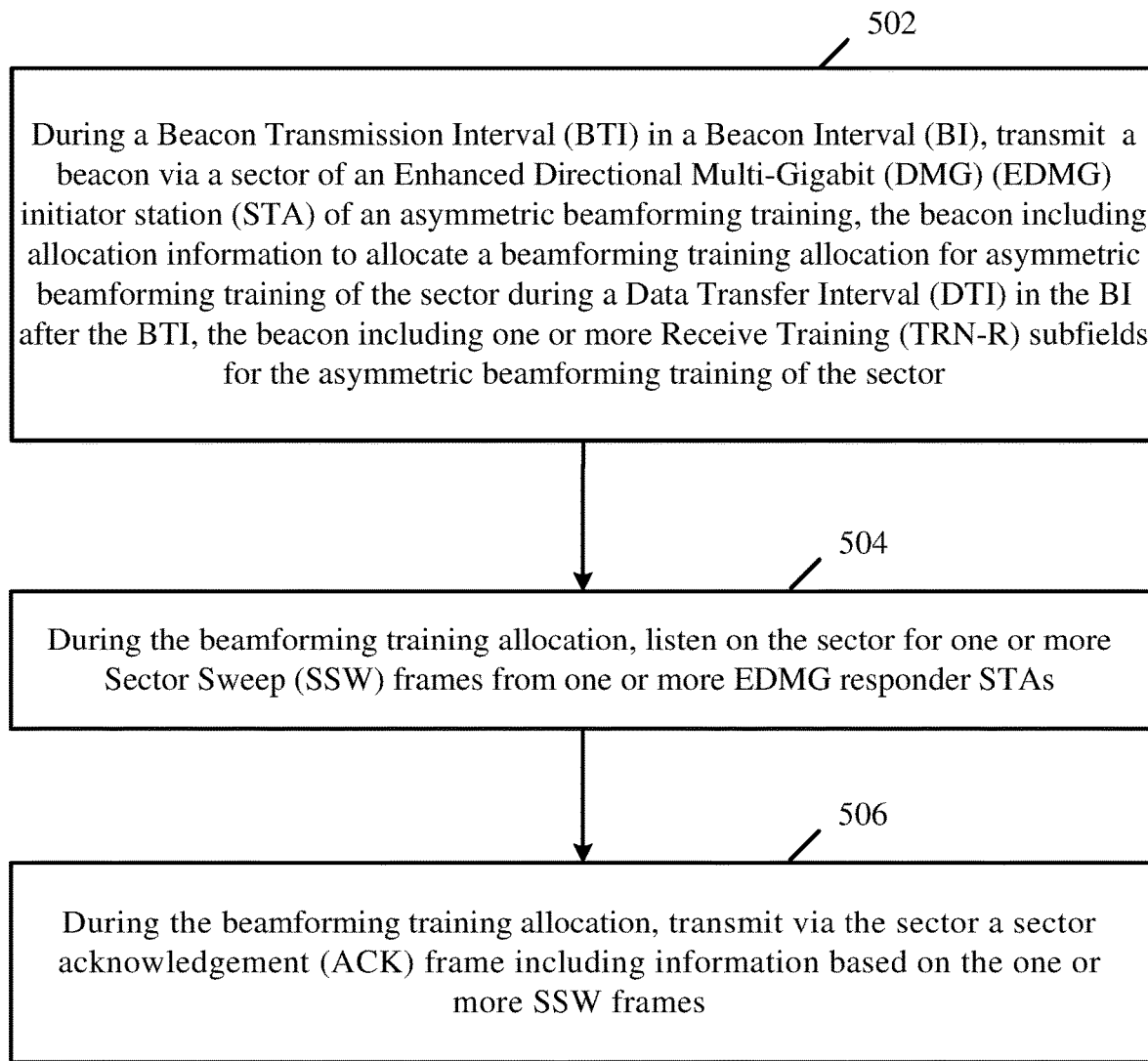
FIG. 5 is a schematic flow-chart illustration of a method of asymmetric beamforming training, in accordance with some demonstrative embodiments.

Reference is made to FIG. 5, which schematically illustrates a method of asymmetric beamforming training, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include, during a BTI in a BI, transmitting a beacon via a sector of an EDMG initiator STA, the beacon including allocation information to allocate a beamforming training allocation for asymmetric beamforming training of the sector during a DTI in the BI after the BTI, the beacon including one or more TRN-R subfields for the asymmetric beamforming training of the sector. For example, controller 124 (FIG. 1) may be configured to cause, trigger, and/or control an EDMG STA implemented by device 102 (FIG. 1) to, during a BTI in a BI, transmit the beacon via the sector of device 102 (FIG. 1), the beacon including the allocation information and the one or more TRN-R subfields for the asymmetric beamforming training of the sector, e.g., as described above.

As indicated at block 504, the method may include, during the beamforming training allocation, listening on the sector for one or more SSW frames from one or more EDMG responder STAs. For example, controller 124 (FIG. 1) may be configured to cause, trigger, and/or control the EDMG STA implemented by device 102 (FIG. 1) to, during the beamforming training allocation, listen on the sector for the one or more SSW frames from the one or more EDMG responder STAs, e.g., as described above.

As indicated at block 506, the method may include, during the beamforming training allocation, transmitting via the sector a sector ACK frame including information based on the one or more SSW frames. For example, controller 124 (FIG. 1) may be configured to cause, trigger, and/or control the EDMG STA implemented by device 102 (FIG. 1) to, during the beamforming training allocation, transmit via the sector the sector ACK frame including the information based on the one or more SSW frames, e.g., as described above.

Figure 6:
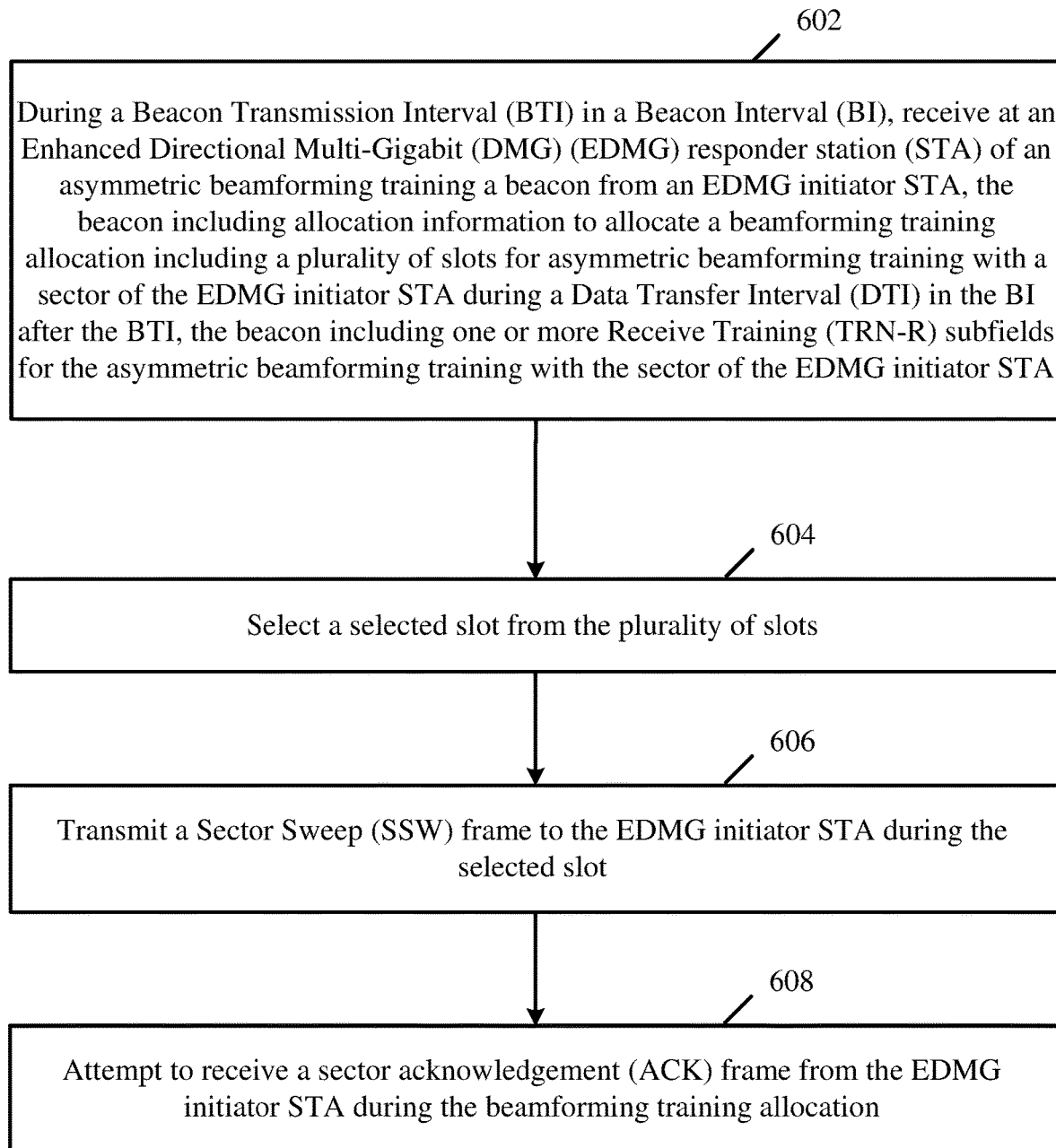
FIG. 6 is a schematic flow-chart illustration of a method of asymmetric beamforming training, in accordance with some demonstrative embodiments.

Reference is made to FIG. 6, which schematically illustrates a method of asymmetric beamforming training, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include, during a BTI in a BI, receiving at an EDMG responder STA a beacon from an EDMG initiator STA, the beacon including allocation information to allocate a beamforming training allocation including a plurality of slots for asymmetric beamforming training with a sector of the EDMG initiator STA during a DTI in the BI after the BTI, the beacon including one or more TRN-R subfields for the asymmetric beamforming training with the sector of the EDMG initiator STA. For example, controller 154 (FIG. 1) may be configured to cause, trigger, and/or control an EDMG STA implemented by device 140 (FIG. 1) to during the BTI in the BI, receive the beacon from device 102 (FIG. 1), the beacon including the allocation information and the one or more TRN-R subfields for the asymmetric beamforming training with the sector of device 102 (FIG. 1), e.g., as described above.

As indicated at block 604, the method may include selecting a selected slot from the plurality of slots. For example, controller 154 (FIG. 1) may be configured to cause, trigger, and/or control the EDMG STA implemented by device 140 (FIG. 1) to select the selected slot from the plurality of slots, e.g., as described above.

As indicated at block 606, the method may include transmitting an SSW frame to the EDMG initiator STA during the selected slot. For example, controller 154 (FIG. 1) may be configured to cause, trigger, and/or control the EDMG STA implemented by device 140 (FIG. 1) to transmit the SSW frame to device 102 (FIG. 1) during the selected slot, e.g., as described above.

As indicated at block 608, the method may include attempting to receive a sector ACK frame from the EDMG initiator STA during the beamforming training allocation. For example, controller 154 (FIG. 1) may be configured to cause, trigger, and/or control the EDMG STA implemented by device 140 (FIG. 1) to attempt to receive the sector ACK frame from device 102 (FIG. 1) during the beamforming training allocation, e.g., as described above.

Reference is made to FIG. 7, which schematically illustrates a product of manufacture 700, in accordance with some demonstrative embodiments. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), device 160 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), device 160 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 5 and/or 6, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 700 and/or machine readable storage media 702 may include one or more types of computer-readable storage media capable of storing data, including volatile memory, non-volatile memory, removable or non-removable memory, erasable or non-erasable memory, writeable or re-writeable memory, and the like. For example, machine readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (DMG) (EDMG) initiator station (STA) of an asymmetric beamforming training to, during a Beacon Transmission Interval (BTI) in a Beacon Interval (BI), transmit a beacon via a sector of the EDMG initiator STA, the beacon comprising allocation information to allocate a beamforming training allocation for asymmetric beamforming training of the sector during a Data Transfer Interval (DTI) in the BI after the BTI, the beacon comprising one or more Receive Training (TRN-R) subfields for the asymmetric beamforming training of the sector; during the beamforming training allocation, listen on the sector for one or more Sector Sweep (SSW) frames from one or more EDMG responder STAs;

and during the beamforming training allocation, transmit via the sector a sector acknowledgement (ACK) frame comprising information based on the one or more SSW frames.

Example 2 includes the subject matter of Example 1, and optionally, wherein the beamforming training allocation comprises a plurality of slots, during which the EDMG initiator STA is to listen on the sector for the one or more SSW frames.

Example 3 includes the subject matter of Example 2, and optionally, wherein the plurality of slots comprises a plurality of space-time slots.

Example 4 includes the subject matter of Example 2 or 3, and optionally, wherein the apparatus is configured to cause the EDMG initiator STA to transmit the sector ACK frame after the plurality of slots.

Example 5 includes the subject matter of any one of Examples 2-4, and optionally, wherein the apparatus is configured to cause the EDMG initiator STA to transmit the sector ACK frame a Medium Beamforming Interframe Space (MBIFS) interval after the plurality of slots.

Example 6 includes the subject matter of any one of Examples 2-5, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 7 includes the subject matter of any one of Examples 1-6, and optionally, wherein the apparatus is configured to cause the EDMG initiator STA to transmit the allocation information in an EDMG extended schedule element.

Example 8 includes the subject matter of any one of Examples 1-7, and optionally, wherein the apparatus is configured to cause the EDMG initiator STA to transmit during the BTI a first beacon via a first sector and a second beacon via a second sector, the first beacon comprising first allocation information to allocate a first beamforming training allocation for the first sector during the DTI, the second beacon comprising second allocation information to allocate a second beamforming training allocation for the second sector during the DTI, the first beamforming training allocation is different from the second beamforming training allocation.

Example 9 includes the subject matter of Example 8, and optionally, wherein the apparatus is configured to cause the EDMG initiator STA to, during the first beamforming training allocation, listen on the first sector for one or more first SSW frames from one or more first EDMG responder STAs, and, to, during the second beamforming training allocation, listen on the second sector for one or more second SSW frames from one or more second EDMG responder STAs.

Example 10 includes the subject matter of Example 9, and optionally, wherein the apparatus is configured to cause the EDMG initiator STA to, during the first beamforming training allocation, transmit via the first sector a first sector ACK frame comprising information based on the one or more first SSW frames, and, to, during the second beamforming training allocation, transmit via the second sector a second sector ACK frame comprising information based on the one or more second SSW frames.

Example 11 includes the subject matter of any one of Examples 1-10, and optionally, wherein the apparatus is configured to cause the EDMG initiator STA to communicate the beacon, the SSW frames, and the sector ACK frame over a frequency band above 45 Gigahertz (GHz).

Example 12 includes the subject matter of any one of Examples 1-11, and optionally, wherein the apparatus is configured to cause the EDMG initiator STA to communicate the beacon, the SSW frames, and the sector ACK frame over a channel bandwidth of 2.16 Gigahertz (GHz), 4.32 GHz, 6.48 GHz, or 8.64 GHz.

Example 13 includes the subject matter of any one of Examples 1-12, and optionally, wherein the EDMG initiator STA comprises an Access Point (AP) or a Personal Basic Service Set (PBSS) Control Point (PCP) (AP/PCP) STA.

Example 14 includes the subject matter of any one of Examples 1-13, and optionally, comprising one or more antennas, a memory, and a processor.

Example 15 includes a system of wireless communication comprising an Enhanced Directional Multi-Gigabit (DMG) (EDMG) initiator station (STA) of an asymmetric beamforming training, the EDMG initiator STA comprising one or more antennas; a radio; a memory; a processor; and a controller configured to cause the EDMG initiator STA to, during a Beacon Transmission Interval (BTI) in a Beacon Interval (BI), transmit a beacon via a sector of the EDMG initiator STA, the beacon comprising allocation information to allocate a beamforming training allocation for asymmetric beamforming training of the sector during a Data Transfer Interval (DTI) in the BI after the BTI, the beacon comprising one or more Receive Training (TRN-R) subfields for the asymmetric beamforming training of the sector; during the beamforming training allocation, listen on the sector for one or more Sector Sweep (SSW) frames from one or more EDMG responder STAs; and during the beamforming training allocation, transmit via the sector a sector acknowledgement (ACK) frame comprising information based on the one or more SSW frames.

Example 16 includes the subject matter of Example 15, and optionally, wherein the beamforming training allocation comprises a plurality of slots, during which the EDMG initiator STA is to listen on the sector for the one or more SSW frames.

Example 17 includes the subject matter of Example 16, and optionally, wherein the plurality of slots comprises a plurality of space-time slots.

Example 18 includes the subject matter of Example 16 or 17, and optionally, wherein the controller is configured to cause the EDMG initiator STA to transmit the sector ACK frame after the plurality of slots.

Example 19 includes the subject matter of any one of Examples 16-18, and optionally, wherein the controller is configured to cause the EDMG initiator STA to transmit the sector ACK frame a Medium Beamforming Interframe Space (MBIFS) interval after the plurality of slots.

Example 20 includes the subject matter of any one of Examples 16-19, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 21 includes the subject matter of any one of Examples 15-20, and optionally, wherein the controller is configured to cause the EDMG initiator STA to transmit the allocation information in an EDMG extended schedule element.

Example 22 includes the subject matter of any one of Examples 15-21, and optionally, wherein the controller is configured to cause the EDMG initiator STA to transmit during the BTI a first beacon via a first sector and a second beacon via a second sector, the first beacon comprising first allocation information to allocate a first beamforming training allocation for the first sector during the DTI, the second beacon comprising second allocation information to allocate a second beamforming training allocation for the second sector during the DTI, the first beamforming training allocation is different from the second beamforming training allocation.

Example 23 includes the subject matter of Example 22, and optionally, wherein the controller is configured to cause the EDMG initiator STA to, during the first beamforming training allocation, listen on the first sector for one or more first SSW frames from one or more first EDMG responder STAs, and, to, during the second beamforming training allocation, listen on the second sector for one or more second SSW frames from one or more second EDMG responder STAs.

Example 24 includes the subject matter of Example 23, and optionally, wherein the controller is configured to cause the EDMG initiator STA to, during the first beamforming training allocation, transmit via the first sector a first sector ACK frame comprising information based on the one or more first SSW frames, and, to, during the second beamforming training allocation, transmit via the second sector a second sector ACK frame comprising information based on the one or more second SSW frames.

Example 25 includes the subject matter of any one of Examples 15-24, and optionally, wherein the controller is configured to cause the EDMG initiator STA to communicate the beacon, the SSW frames, and the sector ACK frame over a frequency band above 45 Gigahertz (GHz).

Example 26 includes the subject matter of any one of Examples 15-25, and optionally, wherein the controller is configured to cause the EDMG initiator STA to communicate the beacon, the SSW frames, and the sector ACK frame over a channel bandwidth of 2.16 Gigahertz (GHz), 4.32 GHz, 6.48 GHz, or 8.64 GHz.

Example 27 includes the subject matter of any one of Examples 15-26, and optionally, wherein the EDMG initiator STA comprises an Access Point (AP) or a Personal Basic Service Set (PBSS) Control Point (PCP) (AP/PCP) STA.

Example 28 includes a method to be performed at an Enhanced Directional Multi-Gigabit (DMG) (EDMG) initiator station (STA) of an asymmetric beamforming training, the method comprising during a Beacon Transmission Interval (BTI) in a Beacon Interval (BI), transmitting a beacon via a sector of the EDMG initiator STA, the beacon comprising allocation information to allocate a beamforming training allocation for asymmetric beamforming training of the sector during a Data Transfer Interval (DTI) in the BI after the BTI, the beacon comprising one or more Receive Training (TRN-R) subfields for the asymmetric beamforming training of the sector; during the beamforming training allocation, listening on the sector for one or more Sector Sweep (SSW) frames from one or more EDMG responder STAs; and during the beamforming training allocation, transmitting via the sector a sector acknowledgement (ACK) frame comprising information based on the one or more SSW frames.

Example 29 includes the subject matter of Example 28, and optionally, wherein the beamforming training allocation comprises a plurality of slots, during which the EDMG initiator STA is to listen on the sector for the one or more SSW frames.

Example 30 includes the subject matter of Example 29, and optionally, wherein the plurality of slots comprises a plurality of space-time slots.

Example 31 includes the subject matter of Example 29 or 30, and optionally, comprising transmitting the sector ACK frame after the plurality of slots.

Example 32 includes the subject matter of any one of Examples 29-31, and optionally, comprising transmitting the sector ACK frame a Medium Beamforming Interframe Space (MBIFS) interval after the plurality of slots.

Example 33 includes the subject matter of any one of Examples 29-32, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 34 includes the subject matter of any one of Examples 28-33, and optionally, comprising transmitting the allocation information in an EDMG extended schedule element.

Example 35 includes the subject matter of any one of Examples 28-34, and optionally, comprising transmitting during the BTI a first beacon via a first sector and a second beacon via a second sector, the first beacon comprising first allocation information to allocate a first beamforming training allocation for the first sector during the DTI, the second beacon comprising second allocation information to allocate a second beamforming training allocation for the second sector during the DTI, the first beamforming training allocation is different from the second beamforming training allocation.

Example 36 includes the subject matter of Example 35, and optionally, comprising, during the first beamforming training allocation, listening on the first sector for one or more first SSW frames from one or more first EDMG responder STAs, and, during the second beamforming training allocation, listening on the second sector for one or more second SSW frames from one or more second EDMG responder STAs.

Example 37 includes the subject matter of Example 36, and optionally, comprising, during the first beamforming training allocation, transmitting via the first sector a first sector ACK frame comprising information based on the one or more first SSW frames, and, during the second beamforming training allocation, transmitting via the second sector a second sector ACK frame comprising information based on the one or more second SSW frames.

Example 38 includes the subject matter of any one of Examples 28-37, and optionally, comprising communicating the beacon, the SSW frames, and the sector ACK frame over a frequency band above 45 Gigahertz (GHz).

Example 39 includes the subject matter of any one of Examples 28-38, and optionally, comprising communicating the beacon, the SSW frames, and the sector ACK frame over a channel bandwidth of 2.16 Gigahertz (GHz), 4.32 GHz, 6.48 GHz, or 8.64 GHz.

Example 40 includes the subject matter of any one of Examples 28-39, and optionally, wherein the EDMG initiator STA comprises an Access Point (AP) or a Personal Basic Service Set (PBSS) Control Point (PCP) (AP/PCP) STA.

Example 41 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) initiator station (STA) of an asymmetric beamforming training to, during a Beacon Transmission Interval (BTI) in a Beacon Interval (BI), transmit a beacon via a sector of the EDMG initiator STA, the beacon comprising allocation information to allocate a beamforming training allocation for asymmetric beamforming training of the sector during a Data Transfer Interval (DTI) in the BI after the BTI, the beacon comprising one or more Receive Training (TRN-R) subfields for the asymmetric beamforming training of the sector; during the beamforming training allocation, listen on the sector for one or more Sector Sweep (SSW) frames from one or more EDMG responder STAs; and during the beamforming training allocation, transmit via the sector a sector acknowledgement (ACK) frame comprising information based on the one or more SSW frames.

Example 42 includes the subject matter of Example 41, and optionally, wherein the beamforming training allocation comprises a plurality of slots, during which the EDMG initiator STA is to listen on the sector for the one or more SSW frames.

Example 43 includes the subject matter of Example 42, and optionally, wherein the plurality of slots comprises a plurality of space-time slots.

Example 44 includes the subject matter of Example 42 or 43, and optionally, wherein the instructions, when executed, cause the EDMG initiator STA to transmit the sector ACK frame after the plurality of slots.

Example 45 includes the subject matter of any one of Examples 42-44, and optionally, wherein the instructions, when executed, cause the EDMG initiator STA to transmit the sector ACK frame a Medium Beamforming Interframe Space (MBIFS) interval after the plurality of slots.

Example 46 includes the subject matter of any one of Examples 42-45, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 47 includes the subject matter of any one of Examples 41-46, and optionally, wherein the instructions, when executed, cause the EDMG initiator STA to transmit the allocation information in an EDMG extended schedule element.

Example 48 includes the subject matter of any one of Examples 41-47, and optionally, wherein the instructions, when executed, cause the EDMG initiator STA to transmit during the BTI a first beacon via a first sector and a second beacon via a second sector, the first beacon comprising first allocation information to allocate a first beamforming training allocation for the first sector during the DTI, the second beacon comprising second allocation information to allocate a second beamforming training allocation for the second sector during the DTI, the first beamforming training allocation is different from the second beamforming training allocation.

Example 49 includes the subject matter of Example 48, and optionally, wherein the instructions, when executed, cause the EDMG initiator STA to, during the first beamforming training allocation, listen on the first sector for one or more first SSW frames from one or more first EDMG responder STAs, and, to, during the second beamforming training allocation, listen on the second sector for one or more second SSW frames from one or more second EDMG responder STAs.

Example 50 includes the subject matter of Example 49, and optionally, wherein the instructions, when executed, cause the EDMG initiator STA to, during the first beamforming training allocation, transmit via the first sector a first sector ACK frame comprising information based on the one or more first SSW frames, and, to, during the second beamforming training allocation, transmit via the second sector a second sector ACK frame comprising information based on the one or more second SSW frames.

Example 51 includes the subject matter of any one of Examples 41-50, and optionally, wherein the instructions, when executed, cause the EDMG initiator STA to communicate the beacon, the SSW frames, and the sector ACK frame over a frequency band above 45 Gigahertz (GHz).

Example 52 includes the subject matter of any one of Examples 41-51, and optionally, wherein the instructions, when executed, cause the EDMG initiator STA to communicate the beacon, the SSW frames, and the sector ACK frame over a channel bandwidth of 2.16 Gigahertz (GHz), 4.32 GHz, 6.48 GHz, or 8.64 GHz.

Example 53 includes the subject matter of any one of Examples 41-52, and optionally, wherein the EDMG initiator STA comprises an Access Point (AP) or a Personal Basic Service Set (PBSS) Control Point (PCP) (AP/PCP) STA.

Example 54 includes an apparatus of wireless communication by an Enhanced Directional Multi-Gigabit (DMG) (EDMG) initiator station (STA) of an asymmetric beamforming training, the apparatus comprising means for, during a Beacon Transmission Interval (BTI) in a Beacon Interval (BI), transmitting a beacon via a sector of the EDMG initiator STA, the beacon comprising allocation information to allocate a beamforming training allocation for asymmetric beamforming training of the sector during a Data Transfer Interval (DTI) in the BI after the BTI, the beacon comprising one or more Receive Training (TRN-R) subfields for the asymmetric beamforming training of the sector; means for, during the beamforming training allocation, listening on the sector for one or more Sector Sweep (SSW) frames from one or more EDMG responder STAs; and means for, during the beamforming training allocation, transmitting via the sector a sector acknowledgement (ACK) frame comprising information based on the one or more SSW frames.

Example 55 includes the subject matter of Example 54, and optionally, wherein the beamforming training allocation comprises a plurality of slots, during which the EDMG initiator STA is to listen on the sector for the one or more SSW frames.

Example 56 includes the subject matter of Example 55, and optionally, wherein the plurality of slots comprises a plurality of space-time slots.

Example 57 includes the subject matter of Example 55 or 56, and optionally, comprising means for transmitting the sector ACK frame after the plurality of slots.

Example 58 includes the subject matter of any one of Examples 55-57, and optionally, comprising means for transmitting the sector ACK frame a Medium Beamforming Interframe Space (MBIFS) interval after the plurality of slots.

Example 59 includes the subject matter of any one of Examples 55-58, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 60 includes the subject matter of any one of Examples 54-59, and optionally, comprising means for transmitting the allocation information in an EDMG extended schedule element.

Example 61 includes the subject matter of any one of Examples 54-60, and optionally, comprising means for transmitting during the BTI a first beacon via a first sector and a second beacon via a second sector, the first beacon comprising first allocation information to allocate a first beamforming training allocation for the first sector during the DTI, the second beacon comprising second allocation information to allocate a second beamforming training allocation for the second sector during the DTI, the first beamforming training allocation is different from the second beamforming training allocation.

Example 62 includes the subject matter of Example 61, and optionally, comprising means for, during the first beamforming training allocation, listening on the first sector for one or more first SSW frames from one or more first EDMG responder STAs, and, during the second beamforming training allocation, listening on the second sector for one or more second SSW frames from one or more second EDMG responder STAs.

Example 63 includes the subject matter of Example 62, and optionally, comprising means for, during the first beamforming training allocation, transmitting via the first sector a first sector ACK frame comprising information based on the one or more first SSW frames, and, during the second beamforming training allocation, transmitting via the second sector a second sector ACK frame comprising information based on the one or more second SSW frames.

Example 64 includes the subject matter of any one of Examples 54-63, and optionally, comprising means for communicating the beacon, the SSW frames, and the sector ACK frame over a frequency band above 45 Gigahertz (GHz).

Example 65 includes the subject matter of any one of Examples 54-64, and optionally, comprising means for communicating the beacon, the SSW frames, and the sector ACK frame over a channel bandwidth of 2.16 Gigahertz (GHz), 4.32 GHz, 6.48 GHz, or 8.64 GHz.

Example 66 includes the subject matter of any one of Examples 54-65, and optionally, wherein the EDMG initiator STA comprises an Access Point (AP) or a Personal Basic Service Set (PBSS) Control Point (PCP) (AP/PCP) STA.

Example 67 includes an apparatus comprising logic and circuitry configured to cause an Enhanced Directional Multi-Gigabit (DMG) (EDMG) responder station (STA) of an asymmetric beamforming training to, during a Beacon Transmission Interval (BTI) in a Beacon Interval (BI), receive a beacon from an EDMG initiator STA, the beacon comprising allocation information to allocate a beamforming training allocation comprising a plurality of slots for asymmetric beamforming training with a sector of the EDMG initiator STA during a Data Transfer Interval (DTI) in the BI after the BTI, the beacon comprising one or more Receive Training (TRN-R) subfields for the asymmetric beamforming training with the sector of the EDMG initiator STA; select a selected slot from the plurality of slots; transmit a Sector Sweep (SSW) frame to the EDMG initiator STA during the selected slot; and attempt to receive a sector acknowledgement (ACK) frame from the EDMG initiator STA during the beamforming training allocation.

Example 68 includes the subject matter of Example 67, and optionally, wherein the apparatus is configured to cause the EDMG responder STA to randomly select the selected slot for transmission of the SSW frame from the plurality of slots.

Example 69 includes the subject matter of Example 67 or 68, and optionally, wherein the apparatus is configured to cause the EDMG responder STA to transmit the SSW frame via a sector of the EDMG responder STA, which is trained by the TRN-R subfields of the beacon.

Example 70 includes the subject matter of any one of Examples 67-69, and optionally, wherein the apparatus is configured to cause the EDMG responder STA to attempt to receive the sector ACK frame from the EDMG initiator STA via a sector of the EDMG responder STA, which is trained by the TRN-R subfields of the beacon.

Example 71 includes the subject matter of any one of Examples 67-70, and optionally, wherein the apparatus is configured to cause the EDMG responder STA to process an EDMG extended schedule element comprising the allocation information.

Example 72 includes the subject matter of any one of Examples 67-71, and optionally, wherein the plurality of slots comprises a plurality of space-time slots.

Example 73 includes the subject matter of any one of Examples 67-72, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 74 includes the subject matter of any one of Examples 67-73, and optionally, wherein the sector ACK frame is a Medium Beamforming Interframe Space (MBIFS) interval after the plurality of slots.

Example 75 includes the subject matter of any one of Examples 67-74, and optionally, wherein the ACK frame comprises information based on the SSW frame.

Example 76 includes the subject matter of any one of Examples 67-75, and optionally, wherein the apparatus is configured to cause the EDMG responder STA to communicate the beacon, the SSW frame, and the sector ACK frame over a frequency band above 45 Gigahertz (GHz).

Example 77 includes the subject matter of any one of Examples 67-76, and optionally, wherein the apparatus is configured to cause the EDMG responder STA to communicate the beacon, the SSW frame, and the sector ACK frame over a channel bandwidth of 2.16 Gigahertz (GHz), 4.32 GHz, 6.48 GHz, or 8.64 GHz.

Example 78 includes the subject matter of any one of Examples 67-77, and optionally, comprising one or more antennas, a memory, and a processor.

Example 79 includes a system of wireless communication comprising an Enhanced Directional Multi-Gigabit (DMG) (EDMG) responder station (STA) of an asymmetric beamforming training, the EDMG responder STA comprising one or more antennas; a radio; a memory; a processor; and a controller configured to cause the EDMG responder STA to, during a Beacon Transmission Interval (BTI) in a Beacon Interval (BI), receive a beacon from an EDMG initiator STA, the beacon comprising allocation information to allocate a beamforming training allocation comprising a plurality of slots for asymmetric beamforming training with a sector of the EDMG initiator STA during a Data Transfer Interval (DTI) in the BI after the BTI, the beacon comprising one or more Receive Training (TRN-R) subfields for the asymmetric beamforming training with the sector of the EDMG initiator STA; select a selected slot from the plurality of slots; transmit a Sector Sweep (SSW) frame to the EDMG initiator STA during the selected slot; and attempt to receive a sector acknowledgement (ACK) frame from the EDMG initiator STA during the beamforming training allocation.

Example 80 includes the subject matter of Example 79, and optionally, wherein the controller is configured to cause the EDMG responder STA to randomly select the selected slot for transmission of the SSW frame from the plurality of slots.

Example 81 includes the subject matter of Example 79 or 80, and optionally, wherein the controller is configured to cause the EDMG responder STA to transmit the SSW frame via a sector of the EDMG responder STA, which is trained by the TRN-R subfields of the beacon.

Example 82 includes the subject matter of any one of Examples 79-81, and optionally, wherein the controller is configured to cause the EDMG responder STA to attempt to receive the sector ACK frame from the EDMG initiator STA via a sector of the EDMG responder STA, which is trained by the TRN-R subfields of the beacon.

Example 83 includes the subject matter of any one of Examples 79-82, and optionally, wherein the controller is configured to cause the EDMG responder STA to process an EDMG extended schedule element comprising the allocation information.

Example 84 includes the subject matter of any one of Examples 79-83, and optionally, wherein the plurality of slots comprises a plurality of space-time slots.

Example 85 includes the subject matter of any one of Examples 79-84, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 86 includes the subject matter of any one of Examples 79-85, and optionally, wherein the sector ACK frame is a Medium Beamforming Interframe Space (MBIFS) interval after the plurality of slots.

Example 87 includes the subject matter of any one of Examples 79-86, and optionally, wherein the ACK frame comprises information based on the SSW frame.

Example 88 includes the subject matter of any one of Examples 79-87, and optionally, wherein the controller is configured to cause the EDMG responder STA to communicate the beacon, the SSW frame, and the sector ACK frame over a frequency band above 45 Gigahertz (GHz).

Example 89 includes the subject matter of any one of Examples 79-88, and optionally, wherein the controller is configured to cause the EDMG responder STA to communicate the beacon, the SSW frame, and the sector ACK frame over a channel bandwidth of 2.16 Gigahertz (GHz), 4.32 GHz, 6.48 GHz, or 8.64 GHz.

Example 90 includes a method to be performed at an Enhanced Directional Multi-Gigabit (DMG) (EDMG) responder station (STA) of an asymmetric beamforming training, the method comprising during a Beacon Transmission Interval (BTI) in a Beacon Interval (BI), receiving a beacon from an EDMG initiator STA, the beacon comprising allocation information to allocate a beamforming training allocation comprising a plurality of slots for asymmetric beamforming training with a sector of the EDMG initiator STA during a Data Transfer Interval (DTI) in the BI after the BTI, the beacon comprising one or more Receive Training (TRN-R) subfields for the asymmetric beamforming training with the sector of the EDMG initiator STA; selecting a selected slot from the plurality of slots; transmitting a Sector Sweep (SSW) frame to the EDMG initiator STA during the selected slot; and attempting to receive a sector acknowledgement (ACK) frame from the EDMG initiator STA during the beamforming training allocation.

Example 91 includes the subject matter of Example 90, and optionally, comprising randomly selecting the selected slot for transmission of the SSW frame from the plurality of slots.

Example 92 includes the subject matter of Example 90 or 91, and optionally, comprising transmitting the SSW frame via a sector of the EDMG responder STA, which is trained by the TRN-R subfields of the beacon.

Example 93 includes the subject matter of any one of Examples 90-92, and optionally, comprising attempting to receive the sector ACK frame from the EDMG initiator STA via a sector of the EDMG responder STA, which is trained by the TRN-R subfields of the beacon.

Example 94 includes the subject matter of any one of Examples 90-93, and optionally, comprising processing an EDMG extended schedule element comprising the allocation information.

Example 95 includes the subject matter of any one of Examples 90-94, and optionally, wherein the plurality of slots comprises a plurality of space-time slots.

Example 96 includes the subject matter of any one of Examples 90-95, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 97 includes the subject matter of any one of Examples 90-96, and optionally, wherein the sector ACK frame is a Medium Beamforming Interframe Space (MBIFS) interval after the plurality of slots.

Example 98 includes the subject matter of any one of Examples 90-97, and optionally, wherein the ACK frame comprises information based on the SSW frame.

Example 99 includes the subject matter of any one of Examples 90-98, and optionally, comprising communicating the beacon, the SSW frame, and the sector ACK frame over a frequency band above 45 Gigahertz (GHz).

Example 100 includes the subject matter of any one of Examples 90-99, and optionally, comprising communicating the beacon, the SSW frame, and the sector ACK frame over a channel bandwidth of 2.16 Gigahertz (GHz), 4.32 GHz, 6.48 GHz, or 8.64 GHz.

Example 101 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) responder station (STA) of an asymmetric beamforming training to, during a Beacon Transmission Interval (BTI) in a Beacon Interval (BI), receive a beacon from an EDMG initiator STA, the beacon comprising allocation information to allocate a beamforming training allocation comprising a plurality of slots for asymmetric beamforming training with a sector of the EDMG initiator STA during a Data Transfer Interval (DTI) in the BI after the BTI, the beacon comprising one or more Receive Training (TRN-R) subfields for the asymmetric beamforming training with the sector of the EDMG initiator STA; select a selected slot from the plurality of slots; transmit a Sector Sweep (SSW) frame to the EDMG initiator STA during the selected slot; and attempt to receive a sector acknowledgement (ACK) frame from the EDMG initiator STA during the beamforming training allocation.

Example 102 includes the subject matter of Example 101, and optionally, wherein the instructions, when executed, cause the EDMG responder STA to randomly select the selected slot for transmission of the SSW frame from the plurality of slots.

Example 103 includes the subject matter of Example 101 or 102, and optionally, wherein the instructions, when executed, cause the EDMG responder STA to transmit the SSW frame via a sector of the EDMG responder STA, which is trained by the TRN-R subfields of the beacon.

Example 104 includes the subject matter of any one of Examples 101-103, and optionally, wherein the instructions, when executed, cause the EDMG responder STA to attempt to receive the sector ACK frame from the EDMG initiator STA via a sector of the EDMG responder STA, which is trained by the TRN-R subfields of the beacon.

Example 105 includes the subject matter of any one of Examples 101-104, and optionally, wherein the instructions, when executed, cause the EDMG responder STA to process an EDMG extended schedule element comprising the allocation information.

Example 106 includes the subject matter of any one of Examples 101-105, and optionally, wherein the plurality of slots comprises a plurality of space-time slots.

Example 107 includes the subject matter of any one of Examples 101-106, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 108 includes the subject matter of any one of Examples 101-107, and optionally, wherein the sector ACK frame is a Medium Beamforming Interframe Space (MBIFS) interval after the plurality of slots.

Example 109 includes the subject matter of any one of Examples 101-108, and optionally, wherein the ACK frame comprises information based on the SSW frame.

Example 110 includes the subject matter of any one of Examples 101-109, and optionally, wherein the instructions, when executed, cause the EDMG responder STA to communicate the beacon, the SSW frame, and the sector ACK frame over a frequency band above 45 Gigahertz (GHz).

Example 111 includes the subject matter of any one of Examples 101-110, and optionally, wherein the instructions, when executed, cause the EDMG responder STA to communicate the beacon, the SSW frame, and the sector ACK frame over a channel bandwidth of 2.16 Gigahertz (GHz), 4.32 GHz, 6.48 GHz, or 8.64 GHz.

Example 112 includes an apparatus of wireless communication by an Enhanced Directional Multi-Gigabit (DMG) (EDMG) responder station (STA) of an asymmetric beamforming training, the apparatus comprising means for, during a Beacon Transmission Interval (BTI) in a Beacon Interval (BI), receiving a beacon from an EDMG initiator STA, the beacon comprising allocation information to allocate a beamforming training allocation comprising a plurality of slots for asymmetric beamforming training with a sector of the EDMG initiator STA during a Data Transfer Interval (DTI) in the BI after the BTI, the beacon comprising one or more Receive Training (TRN-R) subfields for the asymmetric beamforming training with the sector of the EDMG initiator STA; means for selecting a selected slot from the plurality of slots; means for transmitting a Sector Sweep (SSW) frame to the EDMG initiator STA during the selected slot; and means for attempting to receive a sector acknowledgement (ACK) frame from the EDMG initiator STA during the beamforming training allocation.

Example 113 includes the subject matter of Example 112, and optionally, comprising means for randomly selecting the selected slot for transmission of the SSW frame from the plurality of slots.

Example 114 includes the subject matter of Example 112 or 113, and optionally, comprising means for transmitting the SSW frame via a sector of the EDMG responder STA, which is trained by the TRN-R subfields of the beacon.

Example 115 includes the subject matter of any one of Examples 112-114, and optionally, comprising means for attempting to receive the sector ACK frame from the EDMG initiator STA via a sector of the EDMG responder STA, which is trained by the TRN-R subfields of the beacon.

Example 116 includes the subject matter of any one of Examples 112-115, and optionally, comprising means for processing an EDMG extended schedule element comprising the allocation information.

Example 117 includes the subject matter of any one of Examples 112-116, and optionally, wherein the plurality of slots comprises a plurality of space-time slots.

Example 118 includes the subject matter of any one of Examples 112-117, and optionally, wherein a duration of a slot of the plurality of slots is based on a sum of an air propagation time (aAirPropagationTime), a transmission time of an SSW frame (TXTIME(SSW)) and a short Interframe Space (aSIFSTime).

Example 119 includes the subject matter of any one of Examples 112-118, and optionally, wherein the sector ACK frame is a Medium Beamforming Interframe Space (MBIFS) interval after the plurality of slots.

Example 120 includes the subject matter of any one of Examples 112-119, and optionally, wherein the ACK frame comprises information based on the SSW frame.

Example 121 includes the subject matter of any one of Examples 112-120, and optionally, comprising means for communicating the beacon, the SSW frame, and the sector ACK frame over a frequency band above 45 Gigahertz (GHz).

Example 122 includes the subject matter of any one of Examples 112-121, and optionally, comprising means for communicating the beacon, the SSW frame, and the sector ACK frame over a channel bandwidth of 2.16 Gigahertz (GHz), 4.32 GHz, 6.48 GHz, or 8.64 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause a Personal Basic Service Set (PBSS) Control Point (PCP) or Access Point (AP) (PCP/AP) station (STA) to:
   transmit a beacon via a sector of the PCP/AP STA during a Beacon Transmission Interval (BTI), the beacon to schedule a beamforming training allocation for an asymmetric link, the beamforming training allocation to be during a Data Transfer Interval (DTI) after the BTI, the beacon comprising one or more Receive Training (TRN-R) subfields;
   during the beamforming training allocation, listen on the sector for one or more Sector Sweep (SSW) frames from one or more responder STAs; and
   transmit a sector acknowledgement (ACK) frame via the sector during the beamforming training allocation, the sector ACK frame comprising information based on the one or more SSW frames.

2. The apparatus of claim 1, wherein the beamforming training allocation comprises a plurality of space-time slots, during which the PCP/AP STA is to listen on the sector for the one or more SSW frames.

3. The apparatus of claim 2 configured to cause the PCP/AP STA to transmit the sector ACK frame after the plurality of space-time slots.

4. The apparatus of claim 2 configured to cause the PCP/AP STA to transmit the sector ACK frame a Medium Beamforming Interframe Space (MBIFS) interval after the plurality of space-time slots.

5. The apparatus of claim 2, wherein a duration of a space-time slot of the plurality of space-time slots is based on a sum of an air propagation time (aAirPropagationTime), a transmission time of an SSW frame (TXTIME(SSW)) and a short Interframe Space (aSIFSTime).

6. The apparatus of claim 2 configured to cause the PCP/AP STA to indicate a count of the plurality of space-time slots in an Enhanced Directional Multi-Gigabit (DMG) (EDMG) extended schedule element.

7. The apparatus of claim 1, wherein the beacon comprises an Enhanced Directional Multi-Gigabit (DMG) (EDMG) extended schedule element configured to schedule the beamforming training allocation.

8. The apparatus of claim 1, wherein the beacon comprises a Directional Multi-Gigabit (DMG) beacon frame.

9. The apparatus of claim 1 configured to cause the PCP/AP STA to communicate the beacon, the SSW frames, and the sector ACK frame over a frequency band above 45 Gigahertz (GHz).

10. The apparatus of claim 1 comprising a radio to transmit the beacon and the sector ACK frame, and to receive the one or more SSW frames.

11. The apparatus of claim 10 comprising another memory to store data processed by the PCP/AP STA, another processor to execute instructions of an operating system, and a plurality of antenna sectors connected to the radio, the plurality of antenna sectors comprising said sector.

12. A product comprising one or more tangible computer-readable non-transitory storage media comprising computer-executable instructions operable to, when executed by at least one processor, enable the at least one processor to cause a Personal Basic Service Set (PBSS) Control Point (PCP) or Access Point (AP) (PCP/AP) station (STA) to:
  transmit a beacon via a sector of the PCP/AP STA during a Beacon Transmission Interval (BTI), the beacon to schedule a beamforming training allocation for an asymmetric link, the beamforming training allocation to be during a Data Transfer Interval (DTI) after the BTI, the beacon comprising one or more Receive Training (TRN-R) subfields;
  during the beamforming training allocation, listen on the sector for one or more Sector Sweep (SSW) frames from one or more responder STAs; and
  transmit a sector acknowledgement (ACK) frame via the sector during the beamforming training allocation, the sector ACK frame comprising information based on the one or more SSW frames.

13. The product of claim 12, wherein the beamforming training allocation comprises a plurality of space-time slots, during which the PCP/AP STA is to listen on the sector for the one or more SSW frames.

14. The product of claim 13, wherein the instructions, when executed, cause the PCP/AP STA to transmit the sector ACK frame after the plurality of space-time slots.

15. The product of claim 13, wherein the instructions, when executed, cause the PCP/AP STA to transmit the sector ACK frame a Medium Beamforming Interframe Space (MBIFS) interval after the plurality of space-time slots.

16. The product of claim 13, wherein a duration of a space-time slot of the plurality of space-time slots is based on a sum of an air propagation time (aAirPropagationTime), a transmission time of an SSW frame (TXTIME(SSW)) and a short Interframe Space (aSIFSTime).

17. The product of claim 13, wherein the instructions, when executed, cause the PCP/AP STA to indicate a count of the plurality of space-time slots in an Enhanced Directional Multi-Gigabit (DMG) (EDMG) extended schedule element.

18. The product of claim 12, wherein the beacon comprises an Enhanced Directional Multi-Gigabit (DMG) (EDMG) extended schedule element configured to schedule the beamforming training allocation.

19. The product of claim 12, wherein the beacon comprises a Directional Multi-Gigabit (DMG) beacon frame.

20. The product of claim 12, wherein the instructions, when executed, cause the PCP/AP STA to communicate the beacon, the SSW frames, and the sector ACK frame over a frequency band above 45 Gigahertz (GHz).

21. An apparatus comprising:
  means for causing a Personal Basic Service Set (PBSS) Control Point (PCP) or Access Point (AP) (PCP/AP) station (STA) to transmit a beacon via a sector of the PCP/AP STA during a Beacon Transmission Interval (BTI), the beacon to schedule a beamforming training allocation for an asymmetric link, the beamforming training allocation to be during a Data Transfer Interval (DTI) after the BTI, the beacon comprising one or more Receive Training (TRN-R) subfields;
  means for causing the PCP/AP STA to, during the beamforming training allocation, listen on the sector for one or more Sector Sweep (SSW) frames from one or more responder STAs; and
  means for causing the PCP/AP STA to transmit a sector acknowledgement (ACK) frame via the sector during the beamforming training allocation, the sector ACK frame comprising information based on the one or more SSW frames.

22. The apparatus of claim 21, wherein the beamforming training allocation comprises a plurality of space-time slots, during which the PCP/AP STA is to listen on the sector for the one or more SSW frames.

* * * * *